US008465004B1

(12) United States Patent
Fly

(10) Patent No.: US 8,465,004 B1
(45) Date of Patent: Jun. 18, 2013

(54) POST REMOVAL SYSTEM

(76) Inventor: David L. Fly, Columbia, TN (US)

( * ) Notice: Subject to any disclaimer, the term of this patent is extended or adjusted under 35 U.S.C. 154(b) by 0 days.

(21) Appl. No.: 13/368,501

(22) Filed: Feb. 8, 2012

(51) Int. Cl.
*E21B 19/00* (2006.01)
*B66F 3/00* (2006.01)
*A01C 5/02* (2006.01)
*B25B 7/12* (2006.01)

(52) U.S. Cl.
USPC ................ 254/30; 254/124; 254/131; 111/95

(58) Field of Classification Search
USPC ................ 254/30, 31, 124, 131, 132; 111/95
See application file for complete search history.

(56) References Cited

U.S. PATENT DOCUMENTS 1,427,576 A 8/1922 Bryant
1,452,205 A * 4/1923 Madsen .......................... 254/31
1,778,682 A 10/1930 McManus
2,532,533 A 12/1950 Baldwin et al.
3,147,718 A * 9/1964 Steinberg ........................ 111/95
3,615,073 A * 10/1971 Lickey .......................... 254/131
3,779,516 A 12/1973 King
4,738,433 A * 4/1988 Hoff ................................ 254/30
5,022,632 A * 6/1991 Beideck .......................... 254/30
5,186,437 A 2/1993 Scott
D361,248 S 8/1995 Harper et al.
5,681,030 A 10/1997 Nall
5,713,559 A * 2/1998 McClarin et al. ............. 254/124
5,775,673 A * 7/1998 Carnes et al. ................. 254/131
D609,540 S 2/2010 Oberg
8,201,808 B1 * 6/2012 Busalacchi .................. 254/132
2006/0108568 A1 5/2006 Payne

OTHER PUBLICATIONS www.northerntool.com; Tuggy T-Post Puller; Internet; Jul. 12, 2011.

* cited by examiner

*Primary Examiner* — Lee D Wilson
*Assistant Examiner* — Alvin Grant

(57) ABSTRACT

A post removal system having a base plate, a vertical support plate extending upwardly from a top surface of the base plate, and a handle pivotally attached to a top edge of the vertical support plate via a pivot pin, the handle is positioned atop the vertical support plate such that the vertical support plate is at a point between the midpoint and the first end of the handle, the pivot pin is perpendicular to the handle, the handle can pivot upwardly and downwardly about the pivot pin, and a stake gripping component pivotally attached to the first end of the handle via a hinge, the stake gripping component can pivot upwardly and downwardly about the hinge with respect to the handle, the stake gripping component having a slot in a side adjacent to the hinge, wherein the slot is adapted to temporarily accept a stake.

2 Claims, 4 Drawing Sheets

POST REMOVAL SYSTEM

FIELD OF THE INVENTION

The present invention is directed to a lever system for removing posts from ground surfaces.

BACKGROUND OF THE INVENTION

Removing steel posts can be a physically difficult job and can require multiple individuals. The present invention features a post removal system for removing posts from a ground surface. The system of the present invention helps a user, for example a single person, to pull out posts (e.g., steel posts) more easily.

SUMMARY

The present invention features a post removal system. In some embodiments, the post removal system comprises a base plate; a vertical support plate extending upwardly from a top surface of the base plate; a handle pivotally attached to a top edge of the vertical support plate via a pivot pin, the handle has a first end, a second end, and a midpoint halfway between the first end and the second end, the handle is positioned atop the vertical support plate such that the vertical support plate is at a point between the midpoint and the first end of the handle, the pivot pin is perpendicular to the handle, the handle can pivot upwardly and downwardly about the pivot pin; a stake gripping component pivotally attached to the first end of the handle via a hinge, the stake gripping component can pivot upwardly and downwardly about the hinge with respect to the handle, the stake gripping component comprises a slot disposed in a side adjacent to the hinge, wherein the slot is adapted to temporarily accept a stake; and a pin extending upwardly from the hinge in between the handle and the stake gripping component.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
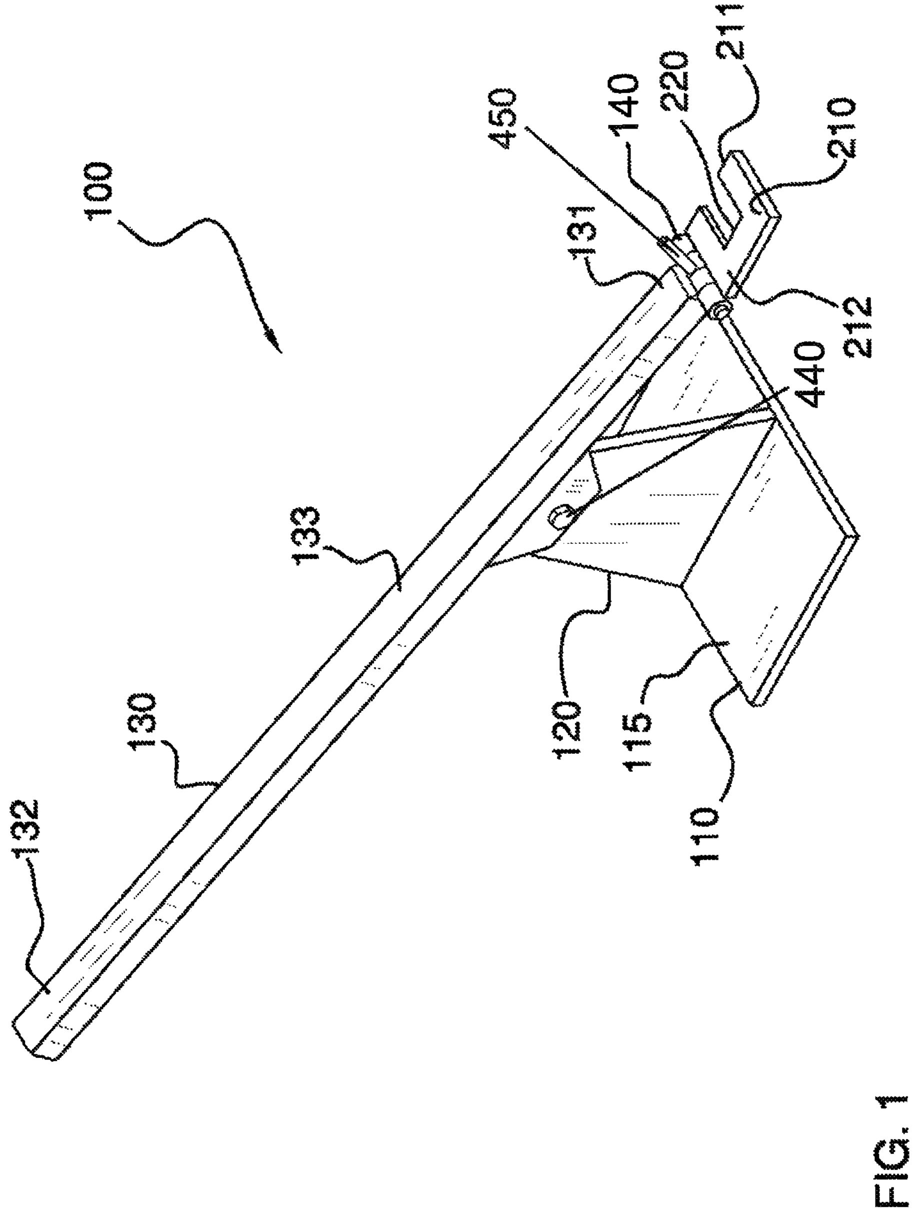
FIG. 1 is a perspective view of the system of the present invention.

Referring now to FIG. 1-5, the present invention features a post removal system 100 for removing posts and stakes from a ground surface. The system 100 comprises a base plate 110 and a vertical support plate 120 disposed on the top surface 115 of the base plate 110 (e.g., the base plate 110 is oriented in a horizontal position relative to the vertical support plate 120). The vertical support plate 120 has a top edge 121. The base plate 110 is adapted to rest on the ground surface, and the vertical support plate 120 extends upwardly from the base plate 110 as shown in FIG. 1.

Figure 2:
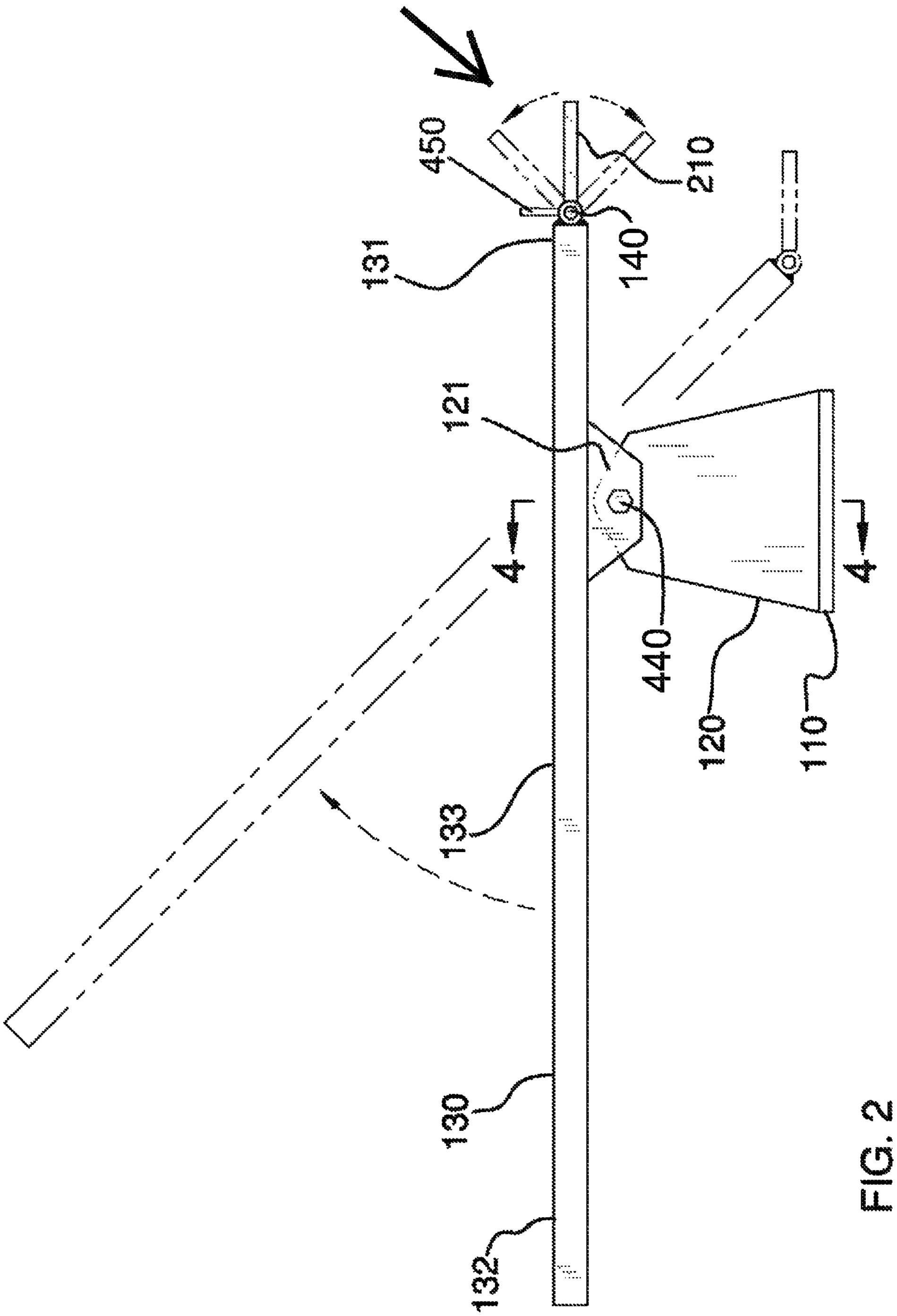
FIG. 2 is a side view of the system of the present invention.
Figure 3:
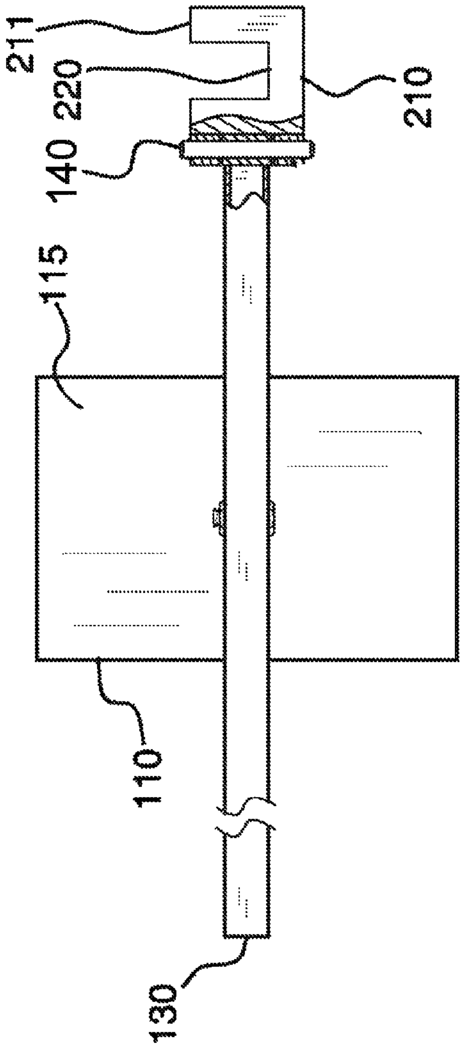
FIG. 3 is a top view of the system of the present invention.
Figure 4:
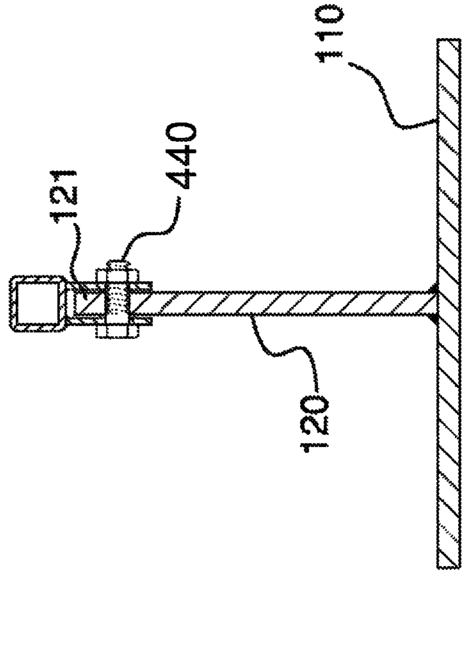
FIG. 4 is a cross sectional view of the system of the present invention.

A handle 130 is pivotally attached to the top edge 121 of the vertical support plate 120 via a pivot pin 440. The pivot pin 440 may include but is not limited to a bolt, screw, or other shaft. The handle 130 can pivot upwardly and downwardly about the pivot pin 440 as shown in FIG. 2. The handle 130 has a first end 131, a second end 132, and a midpoint 133 halfway between the first end 131 and the second end 132. The handle 130 is positioned atop the vertical support plate 120 such that the vertical support plate 120 is between the midpoint 133 and the first end 131 of the handle 130. In some embodiments, the handle 130 is positioned atop the vertical support plate 120 such that the vertical support plate 120 is about halfway between the midpoint 133 and the first end 131 of the handle 130.

Figure 5:
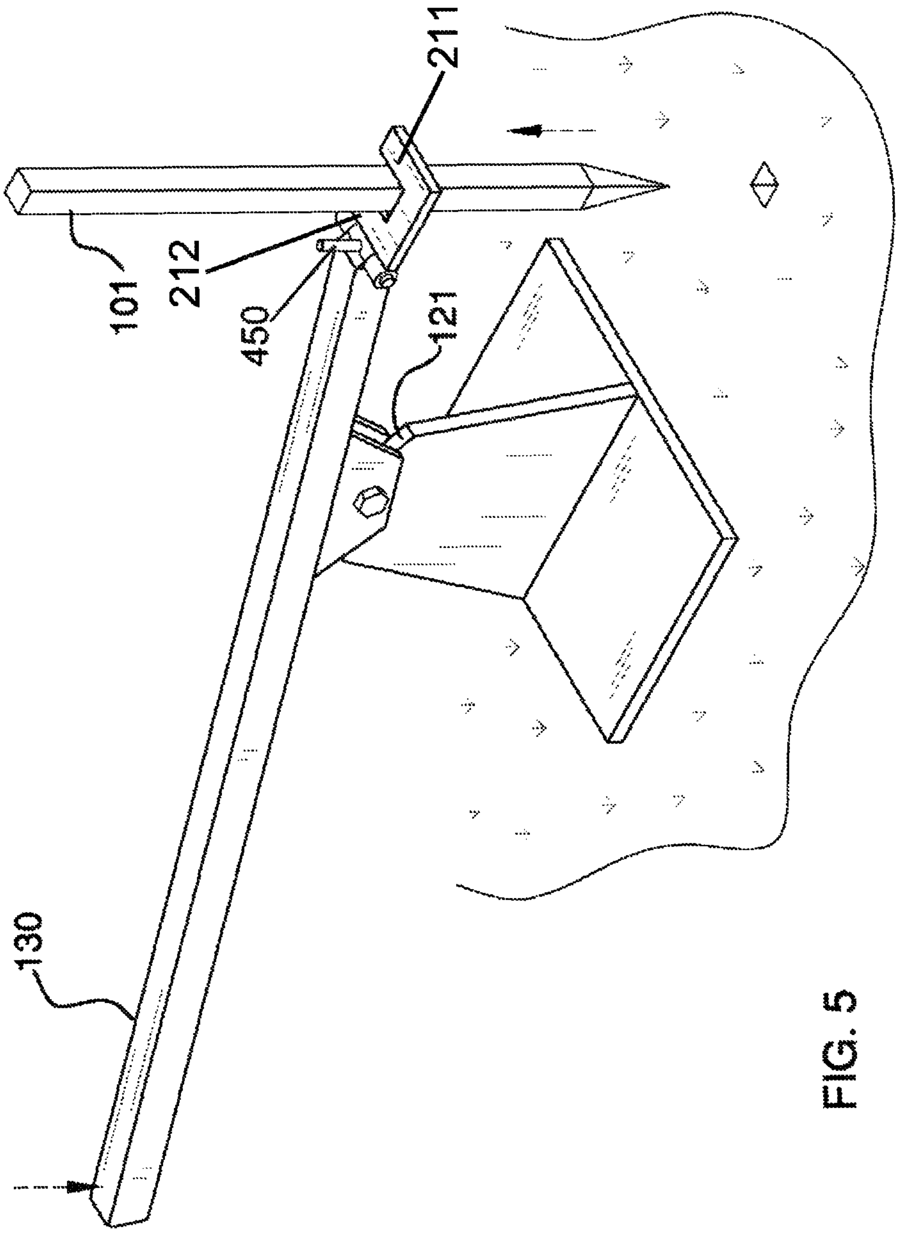
FIG. 5 is an in-use view of the system of the present invention.

A stake gripping component 210 is pivotally attached to the first end 131 of the handle 130 via a hinge 140. The stake gripping component 210 is adapted to temporarily grip or wrap around a stake 101. The stake gripping component 210 can pivot upwardly and downwardly with respect to the handle 130 about the hinge 140 as shown in FIG. 2. The stake gripping component 210 comprises a slot 220 disposed on the first side 211 (or the second side 212) wherein the second side 212 is adjacent to the hinge 140. The slot 220 is adapted to accept a stake 101 as shown in FIG. 5. In some embodiments, the stake gripping component 210 is U-shaped, where the second side 212 of the stake gripping component 210 is adjacent to the hinge 140, and the U-shaped stake gripping component (210) grips the stake from a side of the stake (101).

The system 100 further comprises a pin 450 disposed on the hinge 140 and extending upwardly from the hinge 140, e.g., in between the handle 130 and the stake gripping component 210. The pin 450 may be constructed in a variety of sizes. For example, in some embodiments, the pin 450 may be about ¼ inch in diameter. In some embodiments, the pin 450 is about 1 inch in length. The present invention is not limited to the aforementioned dimensions. The pin 450 may be used to help remove sign posts. Sign posts are well known to one of ordinary skill in the art. The sign posts generally have apertures along their lengths. The pin 450 can be inserted into one of the apertures to help grip the sign post.

The system 100 may be constructed in a variety of shapes and sizes. For example, in some embodiments, the handle 130 is between about 36 to 48 inches in length as measured from the first end 131 to the second end 132. In some embodiments, the handle 130 is between about 48 to 60 inches in length as measured from the first end 131 to the second end 132. In some embodiments, the handle 130 is between about 60 to 72 inches in length as measured from the first end 131 to the second end 132. In some embodiments, the handle 130 is more than about 72 inches in length. In some embodiments, the handle 130 is less than about 36 inches in length.

As used herein, the term "about" refers to plus or minus 10% of the referenced number. For example, an embodiment wherein the handle 130 is about 60 inches in length includes a handle 130 that is between 54 and 66 inches in length.

The disclosures of the following U.S. Patents are incorporated in their entirety by reference herein: U.S. Pat. No. 1,427,576; U.S. Pat. No. 1,778,682; U.S. Pat. No. 2,532,533; U.S. Pat. No. 3,779,516; U.S. Pat. No. 5,186,437; U.S. Pat. No. D361248; U.S. Pat. No. 5,681,030; U.S. Pat. No. D609540; U.S. Patent No. 2006/0108568.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A post removal system (100) comprising:

(a) a base plate (110);

(b) a vertical support plate (120) extending upwardly from a top surface (115) of the base plate (110);

(c) a handle (130) pivotally attached to a top edge (121) of the vertical support plate (120) via a pivot pin (440), the handle (130) has a first end (131), a second end (132), and a midpoint (130) halfway between the first end (131) and the second end (132), the handle (130) is positioned atop the vertical support plate (120) such that the vertical support plate (120) is at a point between the midpoint (133) and the first end (131) of the handle (130), the pivot pin (440) is perpendicular to the handle (130), the handle (130) can pivot upwardly and downwardly about the pivot pin (440);

(d) a stake gripping component (210) pivotally attached to the first end (131) of the handle (130) via a hinge (140), the stake gripping component having a U-shape and having a first side (211) being one of the arms of the U-shape and a second side (212) being another arm of the U-shape, the stake gripping component (210) can freely pivot upwardly and downwardly about the hinge (140) with respect to the handle (130), the stake gripping component (210) comprises a slot (220) disposed between the first side (211) and the second side (212), wherein the second side being adjacent to the hinge (140), wherein the slot (220) is adapted to temporarily accept a stake (101), wherein the U-shaped stake gripping component (210) grips the stake from a side of the stake (101); and (e) a pin (450) extending upwardly from the hinge (140) in between the handle (130) and the stake gripping component (210).

2. A post removal system (100) consisting of:

(a) a base plate (110);

(b) a vertical support plate (120) extending upwardly from a top surface (115) of the base plate (110);

(c) a handle (130) pivotally attached to a top edge (121) of the vertical support plate (120) via a pivot pin (440), the handle (130) has a first end (131), a second end (132), and a midpoint (130) halfway between the first end (131) and the second end (132), the handle (130) is positioned atop the vertical support plate (120) such that the vertical support plate (120) is at a point between the midpoint (133) and the first end (131) of the handle (130), the pivot pin (440) is perpendicular to the handle (130), the handle (130) can pivot upwardly and downwardly about the pivot pin (440);

(d) a stake gripping component (210) pivotally attached to the first end (131) of the handle (130) via a hinge (140), the stake gripping component having a U-shape and having a first side (211) being one of the arms of the U-shape and a second side (212) being another arm of the U-shape, the stake gripping component (210) can freely pivot upwardly and downwardly about the hinge (140) with respect to the handle (130), the stake gripping component (210) comprises a slot (220) disposed between the first side (211) and the second side (212), wherein the second side being adjacent to the hinge (140), wherein the slot (220) is adapted to temporarily accept a stake (101), wherein the U-shaped stake gripping component (210) grips the stake from a side of the stake (101); and (e) a pin (450) extending upwardly from the hinge (140) in between the handle (130) and the stake gripping component (210).

* * * * *